United States Patent [19]

Tenge et al.

[11] Patent Number: 4,646,353
[45] Date of Patent: Feb. 24, 1987

[54] METHOD FOR CHECKING PATTERNS AND APPARATUS TO CARRY OUT SUCH METHOD

[75] Inventors: Johannes Tenge, Huur Hugowaard; Paul A. Tenge, Alkmaar, both of Netherlands

[73] Assignee: Stork Screens B.V., Boxmeer, Netherlands

[21] Appl. No.: 591,276

[22] Filed: Mar. 19, 1984

[30] Foreign Application Priority Data

Mar. 25, 1983 [NL] Netherlands ............. 8301054

[51] Int. Cl.⁴ .................................. G06K 7/00
[52] U.S. Cl. ........................... 382/12; 235/437; 235/440; 235/462
[58] Field of Search .......... 235/462, 463, 440, 437; 382/46, 61; 101/93.04, DIG. 3

[56] References Cited

U.S. PATENT DOCUMENTS

| | | | |
|---|---|---|---|
| 3,728,677 | 4/1973 | Munson | 235/463 |
| 3,852,573 | 12/1974 | Dolch | 382/61 |
| 4,140,271 | 2/1979 | Nojiri et al. | 235/440 |
| 4,282,425 | 8/1981 | Chadima et al. | 235/462 |
| 4,387,298 | 6/1983 | Petersen et al. | 235/462 |
| 4,500,776 | 2/1985 | Laser | 235/462 |

*Primary Examiner*—Leo H. Boudreau
*Attorney, Agent, or Firm*—James E. Nilles

[57] ABSTRACT

A method and apparatus for checking deviations in dimensions and contrast of patterns 1 which are presented for checking purposes at a practically constant speed v of a continuously variably adjustable magnitude, in particular of identical patterns 1 printed on a repetitive fixed area 3 on a strip 2 of flat carrier material 30, each pattern 1 consisting of parallel lines of bar codes printed at predetermined mutual distances, by optically forming an image of each pattern to be checked upon a fixed format and by taking several traverse images therefrom at an angle $\beta$ with respect to the direction 6 of the bars by means of the row(s) of closely arranged electrical sensing elements, said traverse images being read out serially and subsequently entered into an electronic arithmetic apparatus for comparison with a reference pattern.

20 Claims, 11 Drawing Figures

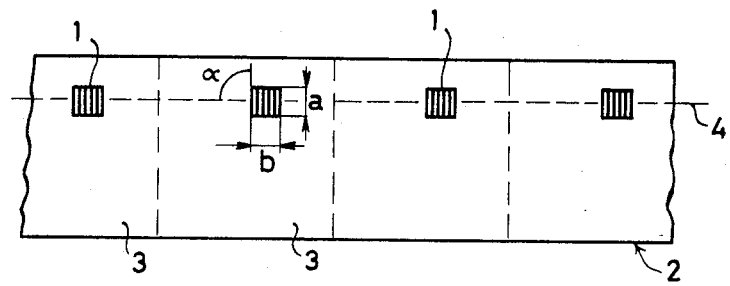
FIG: 1A.
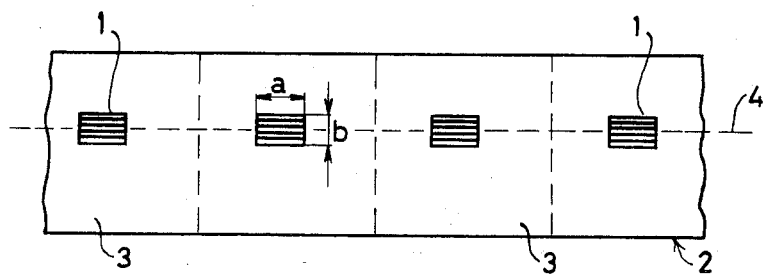
FIG: 1B.
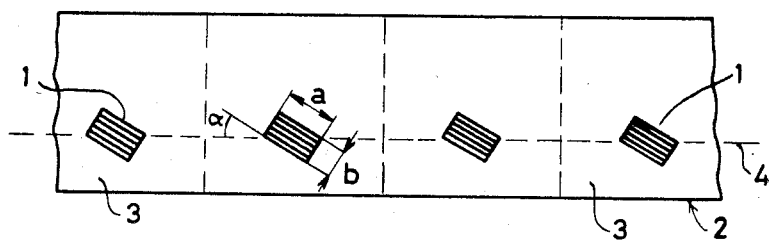
FIG: 1C.
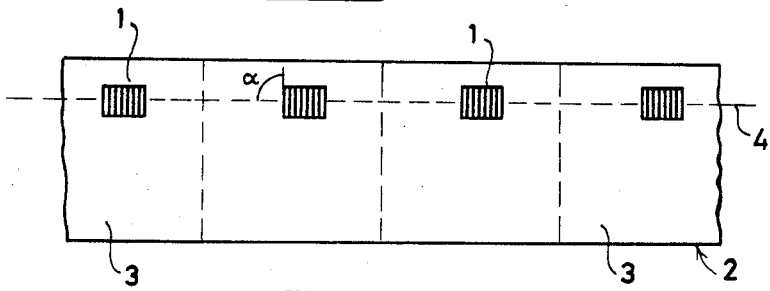
FIG: 1D.

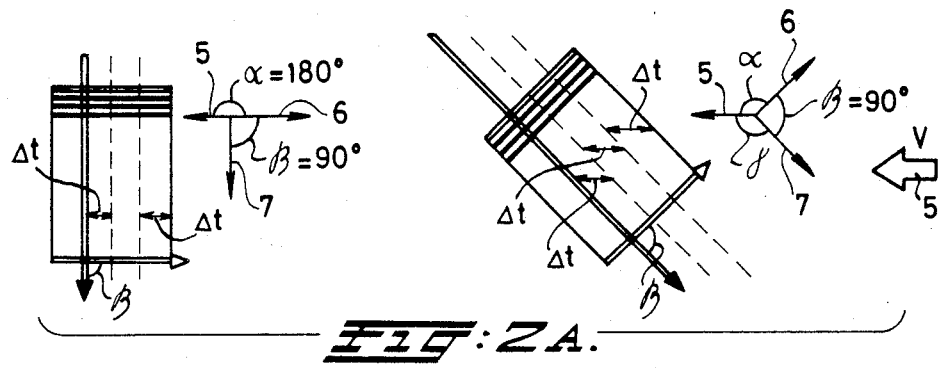
FIG: 2A.
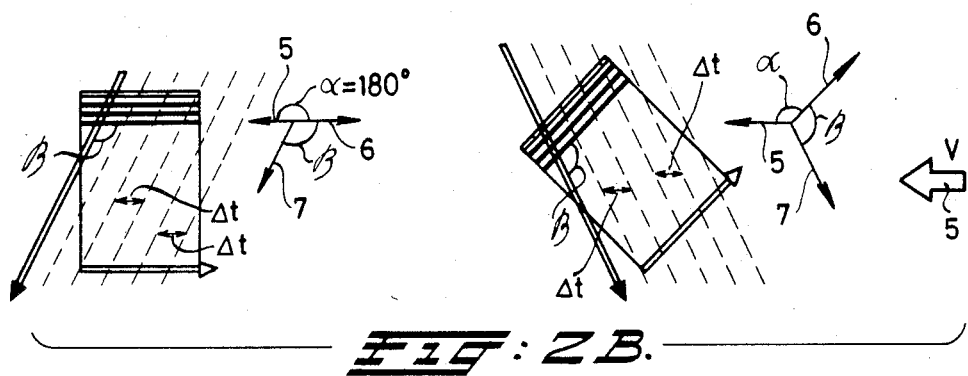
FIG: 2B.
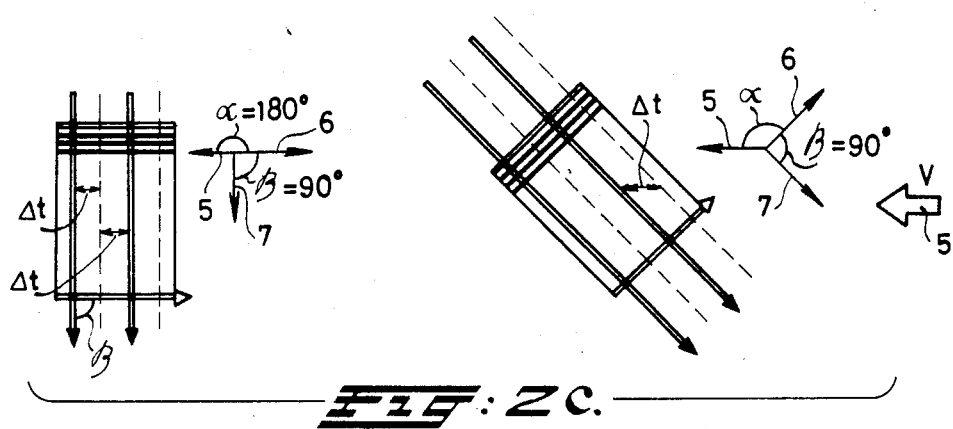
FIG: 2C.

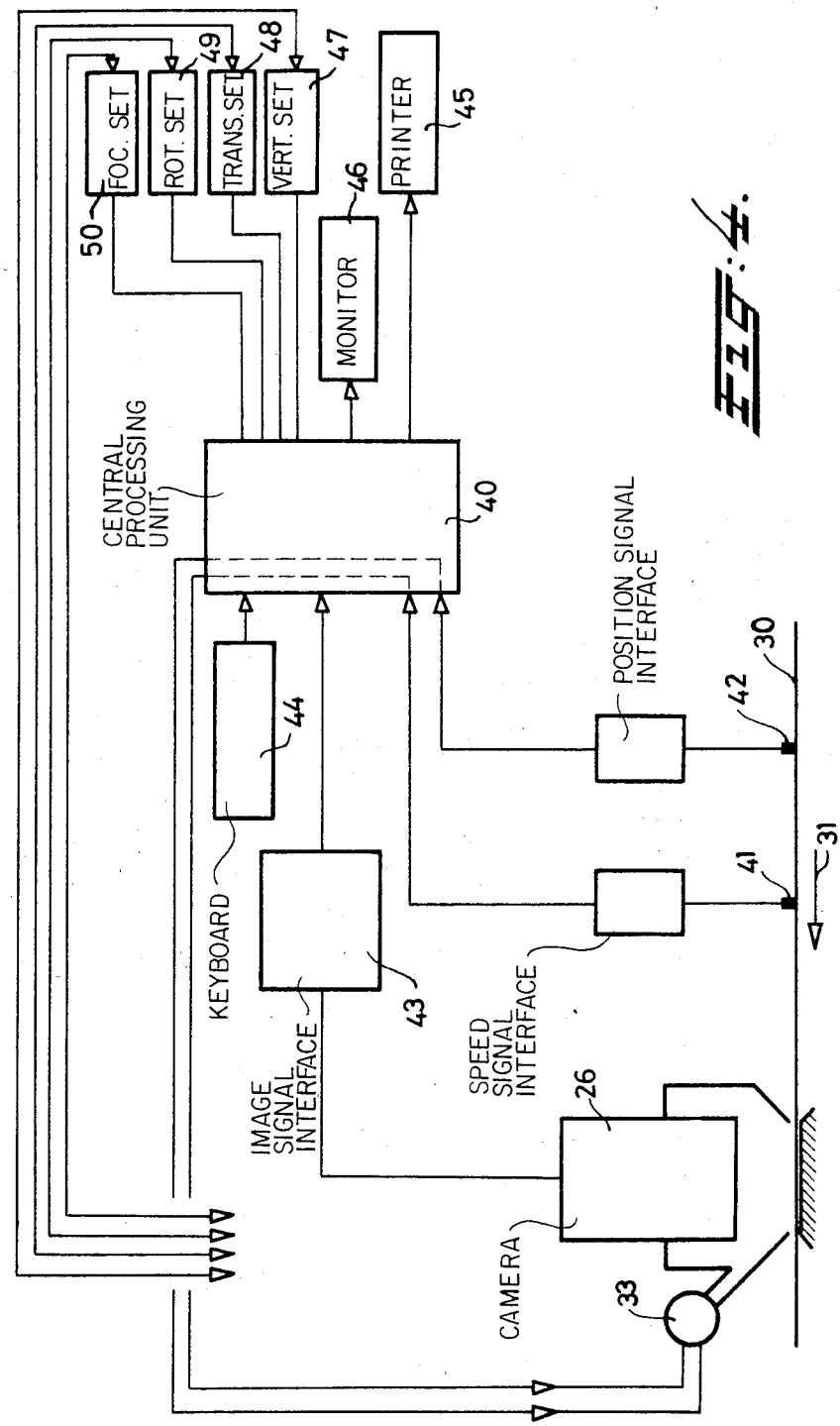

METHOD FOR CHECKING PATTERNS AND APPARATUS TO CARRY OUT SUCH METHOD

The present invention relates to a method for checking deviations in dimensions and contrast of patterns which are presented for checking purposes at a practically constant speed of a continuously variably adjustable magnitude, in particular of identical patterns printed on a repetitive fixed area on a strip of flat carrier material, each pattern consisting of parallel lines of bar codes printed at predetermined mutual distances, the angle $\alpha$ between the direction of the bars and the longitudinal direction of the strip of carrier material being constant but capable of having any value between 0° and $|180°|$, using an optical electronic camera in which there is provided an image receiving system comprised of one or several rows of closely arranged photosensitive electronic sensing elements with associated electronic circuits, an illuminating system and an electronic arithmetic apparatus.

Various methods for using optical electronic cameras for a diverse range of applications are known from the relevant technical literature. A broad survey is provided in the article "Optische Datenerfassung mit CCD-Kameras" by Ing. (grad.) Alfred Dümlein in the journal "Elektronik", No. 25 of Dec. 17, 1982.

It is the main object of the present invention to provide a method enabling the checking of in particular bar codes at high speed and with great accuracy as to dimensions and contrast, said bar codes passing, in an arbitrary but repetitive pattern of mutual distances and at an arbitrary but practically constant speed, along such a camera system having one or several parallel rows of sensing elements, while firstly the checking operation can be performed independently of the print format and pattern position, and secondly checking is afforded over a large number of points in the longitudinal direction of the bars by a small number of rows, even just one row, of sensing elements.

According to the invention, said object is attained by optically forming an image of each pattern to be checked upon a fixed format and by taking several traverse images therefrom at an angle $\beta$ with respect to the direction of the bars by means of the row(s) of closely arranged electrical sensing elements, said traverse images being read out serially and subsequently entered into the electronic arithmetic apparatus for comparison with a reference pattern. The images are formed, while the pattern passes in front of the camera, by illuminating the pattern by means of a series of short lighting flashes whose repetition frequency is proportional to the speed of passage of the pattern. Although image shifting (image blurring) due to the speed of passage of the pattern is already suppressed by applying very short lighting flashes (approx. 2 $\mu$sec), this could still give rise to undesirable inaccuracies resulting from image shifting, in the event of greater values of the speed of passage. Such undesirable image shifting can, however, be compensated for in the arithmetic apparatus on the basis of the measurement of the speed of travel of the strip of flat carrier material upon which the patterns have been printed.

Another object of the invention is to provide an appaartus for carrying out the method according to the invention using an optical electronic camera wherein there is provided an image receiving system comprising one or several rows of closely arranged photosensitive electrical sensing elements with associated electronic circuits, an illuminating system and an electronic arithmetic apparatus, the camera being provided on a frame, in a vertically adjustable relation, above and in transverse direction over the strip of flat carrier material upon which the patterns to be checked have been printed, said camera being, in accordance with the invention, disposed on said frame member so as to be rotatable about the optical axis of its lens assembly. The electrical motor drive means provided for adjusting the vertical, transverse and rotation settings are preferably connected to the electronic arithmetic apparatus for their control. This likewise applies to the drive means for adjusting the lens assembly.

SURVEY OF THE DRAWINGS

FIGS. 1A–D show possible positions of the codes printed on a strip of carrier material;

FIG. 2A illustrates the sensing of a code at several moments using a single row of electrical sensing elements, perpendicular with respect to the bars;

FIG. 2B illustrates the sensing of a code at several moments using a single row of electrical sensing elements which forms an angle $\beta \pm 90°$ with the bars;

FIG. 2C illustrates the sensing of a code at several moments using more (2) rows of electrical sensing elements, perpendicular with respect to the bars;

FIG. 4 shows a block diagram of an apparatus according to the invention.

Figure 2D:
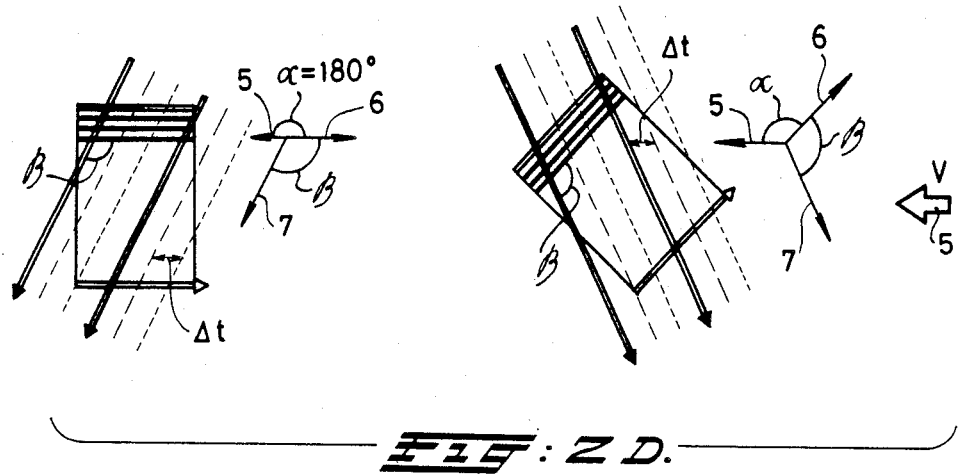
FIG. 2D illustrates the sensing of a code at several moments using more (two) rows of electrical sensing elements which are disposed at an angle $\beta \pm 90°$ with respect to the bars.
Figure 2E:
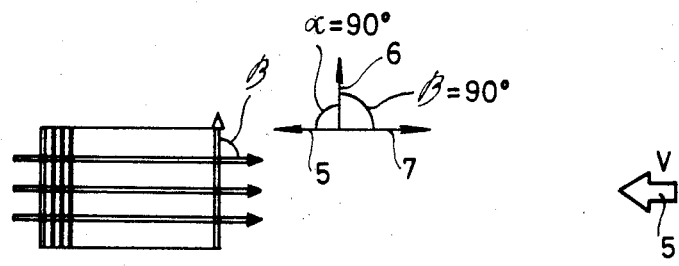
FIG. 2E illustrates the sensing of a code at one moment using several (three) rows of electrical sensing elements.

FIGS. 1A–D show several examples of a strip of flat carrier material 2 having bar codes 1 printed thereon. The codes are in a fixed position of each repetitive, printed area; the position of the code, defined by the magnitude of the angle $\alpha$ between the direction of the bars and the longitudinal direction of the strip of carrier material, is arbitrary but obviously constant for a strip. For a given code, the ratio of the length a to the height b of the format is fixed; however, per strip, the printed code may have any arbitrary format which may be smaller or larger than the standard-format dimensions. In order to measure the codes, the optical camera is to be displaced in transverse direction over the strip of carrier material in such a manner that the optical axis intersects the connecting line 4 through the centers of the printed codes. Furthermore, the camera height above the carrier material and the lens setting should be set in a manner so as to obtain a sharp image having an image dimension used for the standard format. The characteristic data for the code to be checked, i.e. the specific pattern, is entered into the central processing unit as a reference pattern produced on the basis of the standard format, as is at the same time the magnification factor of the printed code with respect to the standard format.

For the various usual code types (UPC, EAN, etc.) for the standard-code format, the nominal bar thicknesses, the widths of the spaces between the bars and the tolerances thereof as well as the tolerances as a function of the magnification factor of the printed code with respect to the standard format, are contained in the memory of the central processing unit used for carrying out the method according to the invention.

The bar thicknesses as measured are compared with the nominal bar thicknesses so as to determine the degree of the deviations, it being furthermore determined whether the latter fall within or outside the tolerances.

FIGS. 2A–E illustrate with several examples the manner in which, in accordance with a number of traverses, the code can be sensed at several places across the entire format so as to obtain measurement data which are processed, in accordance with a specified program, by the arithmetic apparatus for the purpose of checking each code as to deviations in dimensions and contrast. In the figures, the arrow 5 represents the direction and speed v of travel of the strip of carrier material. The direction of travel is obviously the same as the longitudinal direction of the strip of carrier material. The angle between the direction of travel 5 and the direction of bar positioning 6 is indicated by $\alpha$. The angle between the direction 7 of each row of sensing elements in the image area of the camera and the direction of bar positioning 6 is indicated by $\beta$.

FIG. 2A illustrates the case in which one row of electrical sensing elements is used and the camera has been rotated about the optical axis in a manner so that $\beta = 90°$. During the passing of a code in the object area of the camera lens, the code is repetitively briefly illuminated several times, as a result of which a number of traverse-image specimens of the code are successively received by the row of sensing elements. The processing program can be relatively simple because each individual traverse image always comprises the same number of bars and spaces. For a given length 1 of the row of electrical sensing elements having a certain number of sensing elements, the accuracy of measurement is greatest if the length of the traverse is the greatest possible fraction of 1. This is realized only, however, if the code is oriented in a manner so that the direction of bar positioning roughly corresponds to that of the longitudinal direction of the strip of carrier material. By selecting the number of traverses n desired over the height a of the printed code, the time increment $\Delta t$ between the brief sequential illuminations is recorded as a function of the speed of travel v of the carrier material, the angles $\alpha$ and $\beta$, the number of traverses n and the dimensions a and b of the printed-code format. Assuming the first and last traverse to be in the vicinity of the borders of the code format, this relation will be:

$$\Delta t = \frac{a}{v} = \frac{a^2 + b^2 [\cos(\alpha - 90° - \epsilon) - \sin(\alpha - 90° - \epsilon) - \text{tg}(180° - \epsilon)]}{v(n - 1)}$$

in which $\epsilon = \text{bg tg}(a/b)$.

Obviously, $\Delta t$ should not be less than the so-called integration time, i.e. the time required for the entering into and transfer from the electrical sensors of the electric image formed therein. The speed v is obviously to be measured in order to afford setting $\Delta t$. The ratio of the given length 1 of the row of sensing elements to the length (or width) of the code image must be greater according as the orientation of the codes more and more approaches the situation in which the bars are positioned perpendicularly to the longitudinal direction of the strip of carrier material, while $\Delta t$ may increase simultaneously.

FIG. 2C illustrates the case of two parallel rows of electrical sensing elements, the camera being rotated, as in FIG. 2A, about the cylindrical axis in such a manner that in this case $\beta = 90°$, as well. To this, fundamentally the same remarks apply as those applicable to FIG. 2A. In this case, however, a smaller number of illuminating pulses is sufficient to obtain the same number of traverses. The inaccuracy of measurement at corresponding values of the angle $\alpha$ is greater, however, than in the case described hereinbefore, since the length of the rows of sensing elements must be relatively greater in order to ensure that, at the passing of the image of an obliquely oriented code, the upper and lower angular points do not fall outside the area covered by the rows. Codes printed in such a manner that the bars are positioned perpendicularly to the longitudinal direction of the strip of carrier material can, when traversing the bars at right angles in several locations, be checked only by making use of several rows of sensing elements with one illuminating pulse being given per image passing (See FIG. 2E).

A method universally useful for the entire range of the angle $\alpha$ is provided in FIGS. 2B and 2D by way of example for a camera having one row and a camera having two rows of sensing elements, respectively. The row(s) is (are) then disposed at an angle $\beta \neq 90°$ with respect to the bars. According to the angle $\alpha$ at which the codes are printed on the strip of carrier material, the angle $\beta$ can be chosen in a manner so that the ratio of the image size to the length of a row is as great as possible, thus enabling the optical resolution factor of the row to be used as effectively as possible. At an increasing speed v of the code-printed strip of carrier material, image shifting will occur notwithstanding the use of a very short illuminating pulse. This can be compensated on the basis of a measurement of the speed of travel v by means of a program provided to this effect in the electronic arithmetic apparatus so as to enhance the accuracy of measurement.

Figure 3:
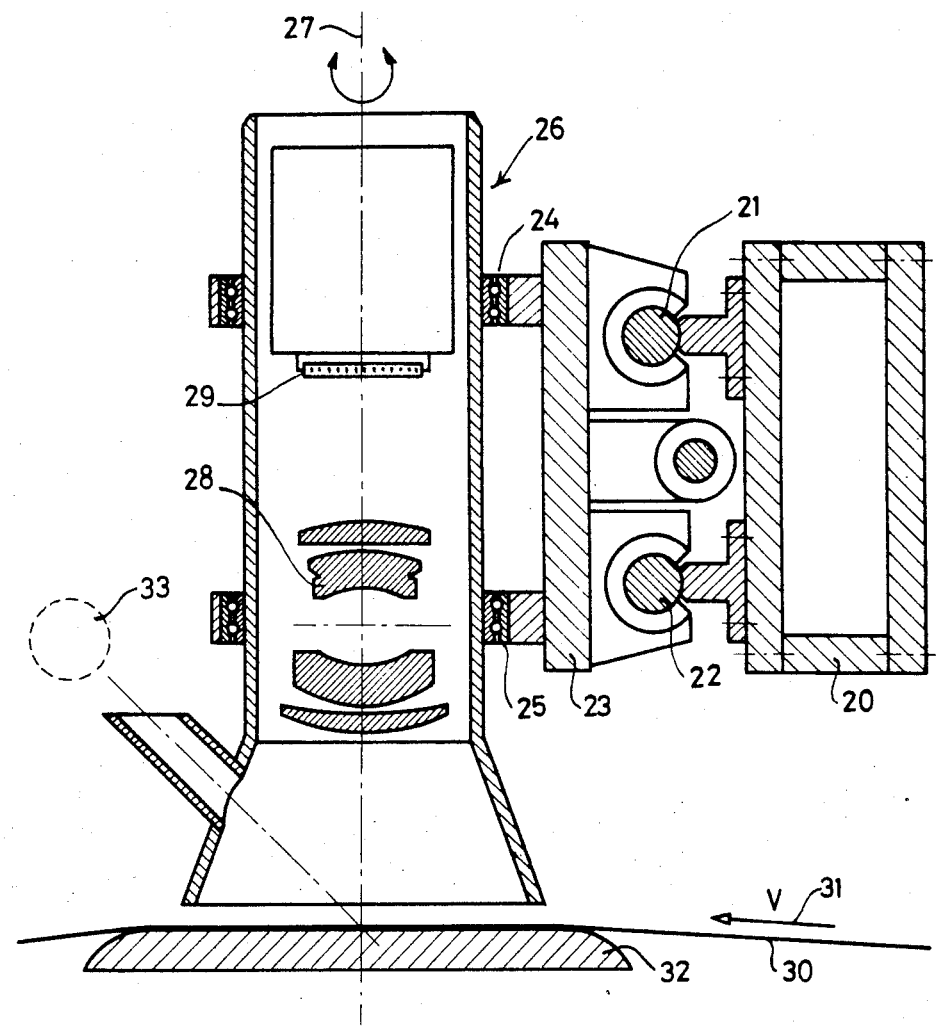
FIG. 3 is a disgrammatic representation of the construction of an optical electronic camera as used according to the present invention.

FIG. 3 is a diagrammatic representation of a camera to be used for carrying out the method. A frame 20 carries two guide rods 21, 22 and there is provided in a slidable relation therealong a carriage 23 which via the bearings 24, 25 carries the camera body 26. Said camera body can thus move in the direction perpendicular to the plane of drawing and around the optical axis 27. It contains an optical imaging system 28, diagrammatically indicated, and the holder 29 for the sensing elements. In order to keep the latter at the temperature which is most favorable to the operation, the holder 29 for the sensing elements can be cooled by means of a Peltier element, not shown. The carrier material 30 with the bar codes to be checked passes in the direction of the arrow 31 over the guide plate 32, and the illumination of the bar codes to be checked is effected by means of a flash-light source 33, shown diagrammatically.

FIG. 4 shows the block diagram of the complete apparatus by which the method according to the invention can be carried out. The central processing unit 40 of the electronic arithmetic apparatus receives data entering thereinto pertaining to the speed of the web of material 30 obtained via the speed sensor 41, and pertaining to the relative position of the patterns obtained by means of the encoder 42 which is, for example, coupled with a roller whose circumferential speed is proportional to the speed of travel of the web of material.

This roller may be, for instance, a roller of a complete printing machine. The mutual positions of the various patterns can be entered into the central processing unit by manually bringing a number of successive bar-code patterns under the camera 26 and entering a suitable setting signal into the processing unit after proper positioning of the pattern.

The signal supplied by the image sensors is transmitted via the interface 43 to the central processing unit 40. The keyboard 44 affords entering all data necessary for the proper functioning of the apparatus.

The apparatus may be provided with a printer 45 for producing printouts of measurement results, and a monitor 46 on which the momentary results are rendered visible. The various setting functions for the camera: vertical setting, transverse setting, setting of rotation and focusing are diagrammatically indicated by the blocks 47–50; the control signals emanating therefrom are transmitted to the camera 26.

When forming each traverse image there is the possibility of determining the degree of contrast of the transitions between bar and space; this is a technique known per se.

As has been described, forming the momentary images is possible by pulsating illumination of the pattern using a flash lamp 33 controlled from the central processing unit 40. However, forming the momentary images can also be achieved by excitation (activation) of the sensing elements in the sampling rhythm.

What is claimed is:

1. Method for effecting quality control in the printing of bar code patterns by checking the geometrical quality of identical bar code configurations, printed in identical orientations on a moving flat carrier by comparing each bar code configuration with a standard configuration, said method comprising the steps of obtaining optically a plurality of images of each of the moving bar code configuration by at least one row of imaging elements of an imaging device, each imaging element converting optically obtained information into an electrical charge, obtaining a read-out of all of the elements of said row at the same time as a charge pattern, and transferring said charge pattern to an electronic computing device which compares said charge pattern with a corresponding standard pattern stored therein, each comparison providing a measure for said geometrical quality of a printed bar code configuration.

2. A method of effecting quality control in the printing of bar code patterns by checking for deviations in dimensions and contrast of printed parallel bars in the patterns, said method comprising the steps of:
moving a plurality of identically sized, identically configured, identically oriented and equidistantly spaced apart patterns along a path at constant speed,
said patterns being oriented so that the parallel bars thereof are disposed at the same angle $\alpha$ relative to said path, which angle $\alpha$ has any value from 0° to $|180°|$;
providing an optical electronic camera having an image receiving system comprising a plurality of closely arranged photosensitive electrical sensing elements therein;
providing an illumination source;
disposing said sensing elements relative to said path and operating said illumination source so as to scan each pattern as it moves adjacent said camera and to cause said sensing elements to provide a plurality of parallel spaced apart traverse images of each pattern,
each traverse image being taken at an angle $\beta$ with respect to the direction of the bars in each pattern and encompassing all bars in each pattern;
providing electronic arithmetic apparatus;
and serially comparing each traverse image of said plurality of traverse images of each pattern with a reference pattern in said apparatus to ascertain whether any deviations in dimensions or contrast appear.

3. A method according to claim 2, in which said image receiving system comprises a plurality of rows of electrical sensing elements, and wherein for all values of $\beta$, except 0° and 180°, and for all values of $\alpha$, on the condition that $\beta \neq 90°$ and $\beta \neq 270°$ when $\alpha = 90°$ or $\alpha = 270°$, the traverse images for each pattern are obtained at the same moment, the direction of the rows of sensing elements not being parallel to the direction of travel.

4. A method according to claim 2, in which said image receiving system comprises a plurality of rows of electrical sensing elements, and wherein the traverse images are all obtained at the same moment when $\beta = 90°$ and $|\alpha| = 90°$.

5. A method according to claim 2, in which the images are formed, while the pattern passes in front of the camera, by illuminating the pattern by means of a series of short lighting flashes whose repetition frequency is proportional to the speed of passage of the pattern.

6. A method according to claim 5, in which in the arithmetic apparatus can compensate for image shifting on the basis of measuring the speed of travel of the strip of flat carrier material upon which the patterns have been located.

7. A method according to claim 2, in which, when using a single row of electrical sensing elements, for all values of $\beta$, except 0° and 180°, and for all values of $\alpha$, on the condition that $\beta \neq 90°$ and $\beta \neq 270°$ when $\alpha = 90°$ or $\alpha = 270°$, the traverse images are obtained at several consecutive moments separated by a time increment $\Delta t$, the direction of the row of sensing elements not being parallel to the direction of travel of the carrier material.

8. A method according to claim 2 wherein said scan is effected so that said plurality of traverse images for each pattern are obtained at successive intervals of time and are serially compared with said reference patterns.

9. A method according to claim 8 wherein said sensing elements are disposed in at least one row which are at said angle $\beta$ with respect to the direction of the bars in each pattern and wherein said illumination source is operated at a plurality of successive intervals of time for each pattern moving along said path.

10. A method according to claim 2 wherein said scan is effected so that said plurality of traverse images for each pattern are obtained simultaneously but are serially compared with said reference pattern.

11. A method according to claim 10 wherein said sensing elements are disposed in a plurality of parallel rows which are at said angle $\beta$ with respect to the direction of the bars in each pattern and wherein said illumination source is operated only once for each pattern to thereby simultaneously obtain said plurality of traverse images.

12. Apparatus for effecting quality control in the printing of bar code patterns by checking for deviations in dimensions and contrast of printed parallel lines in the patterns which are presented for checking purposes at a practically constant speed, said patterns being identical patterns in size and orientation and each pattern being located on a repetitive fixed area on a strip of flat carrier material, each pattern comprised of parallel lines of bar codes and said patterns spaced at predetermined mutual distances from each other, the angle α between the direction of the lines and the longitudinal direction of the strip of carrier material being constant but capable of having any value between 0 and |180°|, said apparatus comprising: means for moving said strip along a path, an optical electronic camera in which there is provided an image receiving system comprised of at least one row of closely arranged photosensitive electrical sensing elements with associated electronic circuits, an illuminating system, an electronic arithmetic apparatus, and means for operating said camera and said illuminating system so that an image is optically formed of each pattern to be checked by taking a plurality of traverse images therefrom at an angle β with respect to the direction of said lines by means of said row of closely arranged electrical sensing elements, said traverse images being read out serially and subsequently entered into said electronic arithmetic apparatus for comparison with a reference pattern.

13. An apparatus according to claim 12, including a single row of electrical sensing elements, whereby for all values of β, except 0° and 180°, and for all values of, on the condition that $β \neq 90°$ and $β \neq 270°$ when α=90° or α=270°, the traverse images are obtained at several consecutive moments separated by a time increment Δt, the direction of the row of sensing elements not being parallel to the direction of travel of the carrier material.

14. An apparatus according to claim 12, including a plurality of rows of electrical sensing elements, whereby for all values of, except 0° and 180°, and for values of α, on the condition that $β \neq 90°$ and $β \neq 270°$ when α=90° or α=270°, the traverse images are obtained at the same moment, and the direction of the row of sensing elements are not parallel to the direction of travel.

15. An apparatus according to claim 14, in which, in the event of more than one row of electrical sensing elements being used, the traverse images are all obtained at the same moment when β=90° and |α|=90°.

16. An apparatus according to claim 12, wherein said illuminating system includes a flash-light source, and in which the images are formed, while the pattern passes in front of the camera, by illuminating the pattern by means of said flash-light source which provides a series of short lighting flashes whose repetition frequency is proportional to the speed of passage of the pattern.

17. An apparatus according to claim 16, in which in the arithmetic apparatus includes means which can compensate for image shifting on the basis of the measurement of the speed of travel of the strip of flat carrier material upon which the patterns have been printed.

18. Apparatus according to claim 12 wherein said camera comprises a lens assembly having an optical axis and wherein said apparatus further comprises:
 a camera support frame;
 and mounting means for mounting said camera on said camera support frame above said path along which said strip moves and with said optical axis disposed vertically transverse to said path, said mounting means enabling said camera to be adjustably movable vertically toward and away from said path, adjustably movable horizontally transversely above and relative to said path, and adjustably movable rotatably about said optical axis.

19. An apparatus according to claim 18, wherein an electronic drive means are provided for adjusting the vertical, transverse and rotation settings of the camera and are connected to the electronic arithmetic apparatus for control thereby.

20. An apparatus according to claim 18, wherein an electronic drive means are provided for the adjustment of the lens assembly and are connected to the electronic arithmetic apparatus for control thereby.

* * * * *